(12) United States Patent
Anikhindi et al.

(10) Patent No.: US 6,990,059 B1
(45) Date of Patent: Jan. 24, 2006

(54) INTERFERENCE MITIGATION IN A WIRELESS COMMUNICATION SYSTEM

(75) Inventors: Santosh Anikhindi, San Jose, CA (US); Iain Botterill, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 869 days.

(21) Appl. No.: 09/947,283

(22) Filed: Sep. 5, 2001

(51) Int. Cl.
H04J 11/00 (2006.01)
H04B 7/212 (2006.01)
H04L 12/26 (2006.01)

(52) U.S. Cl. ............... 370/208; 370/347; 370/252; 375/346

(58) Field of Classification Search ......... 370/208, 370/210, 330, 347, 252; 375/219, 346
See application file for complete search history.

(56) References Cited

U.S. PATENT DOCUMENTS

| | | | |
|---|---|---|---|
| 5,285,474 A | 2/1994 | Chow et al. | 375/13 |
| 5,488,632 A | 1/1996 | Mason et al. | 375/260 |
| 5,636,246 A | 6/1997 | Tzannes et al. | 375/360 |
| 5,644,603 A | 7/1997 | Ushirokawa | 375/341 |
| 5,751,766 A | 5/1998 | Kletsky et al. | 375/224 |
| 5,901,187 A | 5/1999 | Iinuma | 375/347 |
| 5,923,666 A | 7/1999 | Gledhill et al. | 370/480 |
| 5,949,793 A | 9/1999 | Bossard et al. | 370/487 |
| 5,966,401 A | 10/1999 | Kumar | 375/200 |
| 6,035,000 A * | 3/2000 | Bingham | 375/296 |
| 6,052,605 A | 4/2000 | Meredith et al. | 455/561 |
| 6,118,832 A | 9/2000 | Mayrargue et al. | 375/346 |
| 6,125,109 A | 9/2000 | Fuerter | 370/315 |
| 6,144,710 A | 11/2000 | Chen et al. | 375/346 |
| 6,185,251 B1 | 2/2001 | Fertner | 375/231 |
| 6,192,026 B1 | 2/2001 | Pollack et al. | 370/203 |
| 6,282,168 B1 | 8/2001 | Vijayan et al. | 370/203 |
| 6,289,045 B1 | 9/2001 | Hasegawa et al. | 375/321 |
| 6,298,035 B1 | 10/2001 | Heiskala | 370/206 |
| 6,327,314 B1 | 12/2001 | Cimini, Jr. | 375/340 |
| 6,683,864 B1 * | 1/2004 | Usui | 370/346 |
| 6,721,569 B1 * | 4/2004 | Hashem et al. | 455/450 |
| 2003/0021245 A1 * | 1/2003 | Haumonte et al. | 370/330 |

FOREIGN PATENT DOCUMENTS

| | | |
|---|---|---|
| EP | 1056250 | 11/2000 |
| WO | WO98/09385 | 3/1998 |
| WO | WO98/18271 | 4/1998 |

OTHER PUBLICATIONS

Roger A. Horn, "Matrix Analysis" Cambridge University Press, pp. 18-19.

Vincent K. Jones, et al., "Improved System for Interference Cancellation", U.S. Appl. No. 09/234,629 filed Jan. 21, 1999.

(Continued)

*Primary Examiner*—Duc Ho
(74) *Attorney, Agent, or Firm*—Dov Rosenfeld; Inventek

(57) ABSTRACT

By virtue of one embodiment of the present invention, dynamic signal to noise ratio measurements made on received signals are used to identify degraded segments of a channel. The degraded segments are then no longer used for transmitting payload data. In the context of an orthogonal frequency division multiplexing (OFDM) communication system, degraded OFDM subchannels, as determined on a real-time basis, are not used to transmit payload data. In an OFDM network where access is shared in the time domain among multiple transmitters and a single allocable time slot includes an integer number of OFDM bursts, the medium access control layer adjusts packet length, and therefore the amount of data to be included in a given slot, in response to the fluctuating number of available subchannels.

4 Claims, 6 Drawing Sheets

OTHER PUBLICATIONS

Vincent K. Jones, et al., "OFDM Channel Estimation in the Presence of Interference", U.S. Appl. No. 09/410,945 filed Oct. 4, 1999.

Vincent K. Jones, et al., "Improved OFDM Channel Identification", U.S. Appl. No. 09/234,929 filed Jan. 21, 1999.

* cited by examiner

INTERFERENCE MITIGATION IN A WIRELESS COMMUNICATION SYSTEM

STATEMENT OF RELATED APPLICATIONS

The present invention is related to the subject matter of the following U.S. patent applications:

U.S. patent application Ser. No. 09/234,929 entitled, "IMPROVED OFDM CHANNEL IDENTIFICATION" filed Jan. 21, 1999, now U.S. Pat. No. 6,611,551.

U.S. patent application Ser. No. 09/234,629 entitled, "SYSTEM FOR INTERFERENCE CANCELLATION" filed Jan. 21, 1999, now U.S. Pat. No. 6,442,130.

U.S. patent application Ser. No. 09/410,945 entitled, "OFDM CHANNEL ESTIMATION IN THE PRESENCE OF INTERFERENCE" filed Oct. 4, 1999, now U.S. Pat. No. 6,487,253.

U.S. patent application Ser. No. 09/419,444 entitled "DECODING DATA FROM MULTIPLE SOURCES", filed Oct. 15, 1999, now U.S. Pat. No. 6,654,921.

BACKGROUND OF THE INVENTION

The present invention relates to communications systems, and more particularly to broadband communication systems.

A point to multipoint wireless communication system represents a potentially effective solution to the problem of providing broadband network connectivity to a large number of geographically distributed points. Unlike optical fiber, DSL, and cable modems there is no need to either construct a new wired infrastructure or substantially modify a wired infrastructure that has been constructed for a different purpose.

Broadband wireless communications requires the use of a segment of the electromagnetic spectrum. One detriment to successful data communication is the presence of other transmissions in the utilized spectrum. For example, the MMDS band, including 2.5–2.7 GHz, is envisioned as a prime candidate for the expansion of broadband wireless Internet access services. However, wireless data transmissions there may be subject to interference from incumbent narrowband analog video transmissions. Another band slated for broadband wireless Internet access is the U-NII (Unlicensed National Information Infrastructure) band at 5.725–5.85 GHz, but the unlicensed Internet access transmissions there are subject to interference from other such transmissions as well as other services entitled to access to the band. Aside from spectrally overlapping unwanted signals, there is also self-interference resulting from signal reflections between the transmitter and receiver.

One approach to mitigating the problem presented by interference is to increase the use of forward error correction (FEC). In forward error correction, error correction coding is used to incorporate redundancy in the transmitted information so that the receiver is able to detect and correct errors in the face of channel impairments such as noise and/or interference. The more redundancy that is added, the greater the level of interference that the receiver may tolerate without impairment of communications. The disadvantage of this approach is that link capacity used to incorporate redundancy reduces the payload data carrying capacity. Furthermore, the redundant data is typically spread across the entire channel even though the interference may be limited to a rather narrow segment.

Another approach to handling interference is to incorporate knowledge of the interference environment in the planning of the network. Before deploying the broadband wireless communication network, a site survey is carried out to measure the interference environment in which the network will be expected to operate. Relevant potential interference that could adversely affect the link performance is identified. Where appropriate, transmitter power is increased, larger more direct antennas are employed, or additional base stations are deployed.

This approach that relies on work done at the network planning stage carries multiple drawbacks. The network modifications adopted in response to the measured interference increase deployment costs and/or reduce network capacity. Furthermore, the long-term characteristics of the channel cannot be predicted based on measurements made at the time of deployment. Interference may change frequency and location, even in real-time, rendering modifications made at deployment time essentially useless.

What is needed are systems and methods for combating interference that minimize loss of data carrying capacity and can handle rapid variation in the interference environment while adding minimal cost to network deployment.

SUMMARY OF THE INVENTION

By virtue of one embodiment of the present invention, dynamic signal to noise ratio measurements made on received signals are used to identify degraded segments of a channel. The degraded segments are then no longer used for transmitting payload data. In the context of an orthogonal frequency division multiplexing (OFDM) communication system, degraded OFDM subchannels, as determined on a real-time basis, are not used to transmit payload data. In an OFDM network where access is shared in the time domain among multiple transmitters and a single allocable time slot includes an integer number of OFDM bursts, the medium access control layer adjusts packet length, and therefore the amount of data to be included in a given slot, in response to the fluctuating number of available subchannels.

According to a first aspect of the present invention, a method for operating a central access point in a point to multipoint OFDM communication network includes: monitoring reception quality in a plurality of OFDM subchannels, designating a selected subchannel as below a quality threshold, and instructing a subscriber unit to not transmit payload data in the selected subchannel.

According to a second aspect of the present invention, a method for operating a subscriber unit in a point to multipoint OFDM communication network includes: receiving an instruction message from a central access point where the instruction message includes information identifying OFDM subchannels to be left unused in future upstream transmissions and transmitting an OFDM burst where subchannels are left unused for transmitting data in accordance with the instruction message.

According to a third aspect of the present invention, a method for operating a node includes: monitoring noise and/or interference conditions within OFDM subchannels, identifying subchannels impacted by noise and/or interference conditions, and signaling another node to not include payload data in the impacted subchannels.

According to a fourth aspect of the present invention, a method for operating a node in an OFDM communication system includes: receiving instructions identifying subchannels impacted by noise and/or interference conditions where the subchannels are determined based on real-time signal measurements and transmitting an OFDM burst that does not employ the impacted subchannels for carrying payload data.

Further understanding of the nature and advantages of the inventions herein may be realized by reference to the remaining portions of the specification and the attached drawings.

DESCRIPTION OF SPECIFIC EMBODIMENTS

Figure 1:
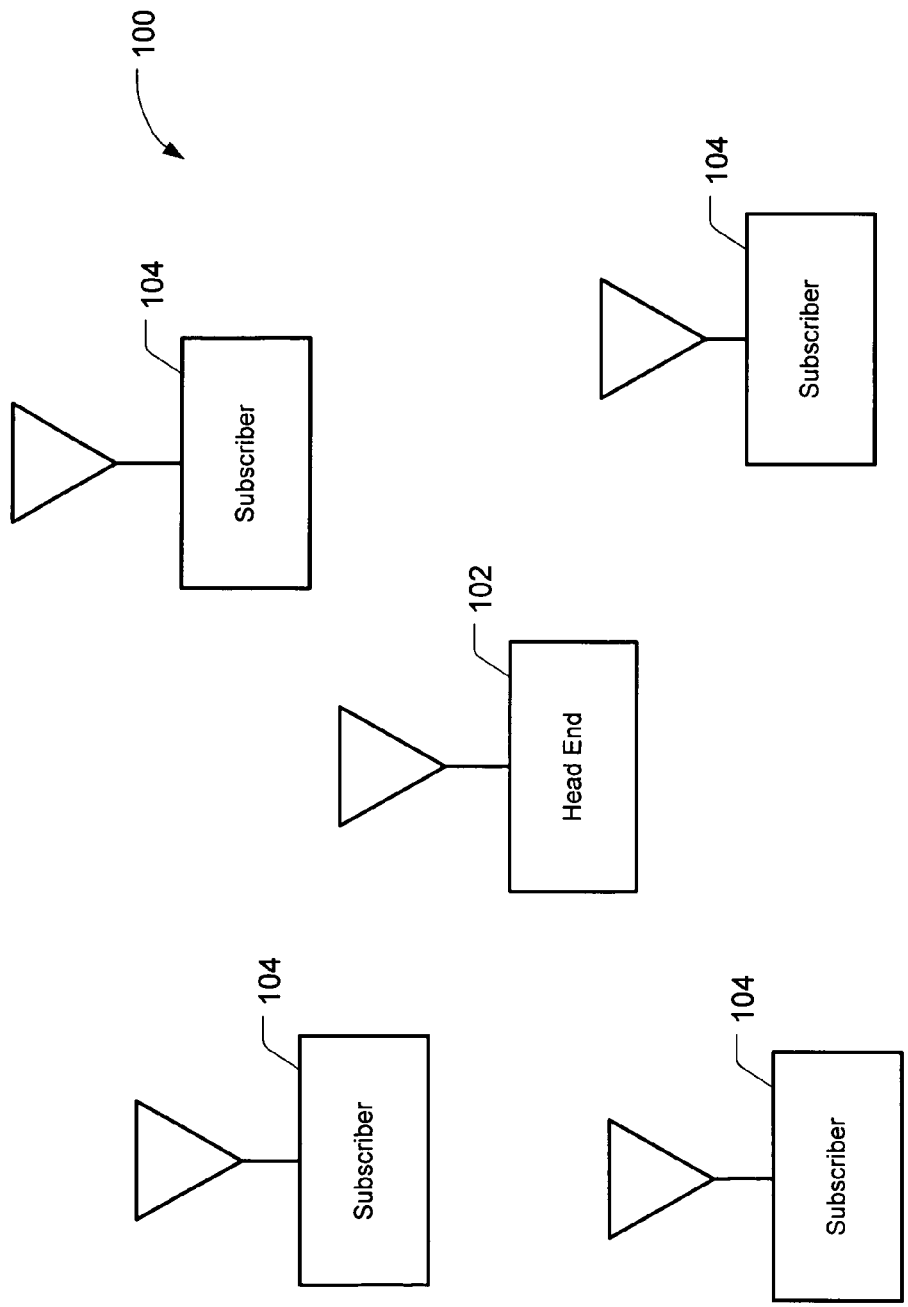
FIG. 1 depicts a point to multipoint communication network according to one embodiment of the present invention.

FIG. 1 depicts a point to multipoint wireless communication network 100 suitable for implementing one embodiment of the present invention. The present invention is, however, not limited to wireless networks. Network 100 includes a central access point or head end 102 and multiple subscriber units 104. All communication is typically either to or from central access point 102. Communication from central access point 102 to one or more of subscriber units 104 is herein referred to as downstream communication. Communication from any one of subscriber units 104 to central access point 102 is herein referred to as upstream communication. In one embodiment, different frequencies are allocated to upstream and downstream communication. This is referred to as frequency division duplexing (FDD). Alternatively, time division duplexing (TDD) may be employed where upstream and downstream communications share the same frequencies. Although the point to multipoint network is used to describe an exemplary embodiment, the present invention may also be applied to, e.g., point to point networks, peer to peer networks, mesh networks, etc.

In one embodiment, both upstream communication and downstream communication are coordinated in accordance with the medium access control (MAC) layer protocol defined by the DOCSIS v1.1 standard as described in the Data-Over-Cable Service Interface Specifications, Radio Frequency Interface Specifications, SP-RFI v1.1-I06-001215 published by Cable Television Laboratories in 2000, herein incorporated by reference in its entirety and referred to as "DOCSIS v1.1 Specifications" or simply "DOCSIS v1.1".

The DOCSIS v 1.1 standard defines a MAC layer protocol that finds application not only in data-over cable-networks but also in wireless networks. For upstream transmission, DOCSIS v 1.1 defines a time domain multiple access (TDMA) scheme where the time domain is divided into "minislots" that are allocated for use by individual subscriber units 104 under the control of central access point 102. DOCSIS v1.1 also defines physical layer protocols for data over cable networks. In a wireless network, it is advantageous to combine a MAC layer along the lines of DOCSIS v1.1 with a physical layer system based on orthogonal frequency division multiplexing (OFDM). This type of system has been found to better handle the challenges presented by wireless communication channels, such as multipath reflections and the resulting intersymbol interference.

OFDM divides the available spectrum within a channel into narrow subchannels. In a given so-called "burst", each subchannel transmits one data symbol. Each subchannel, therefore, operates at a very low data rate compared to the channel as a whole. To achieve transmission within orthogonal subchannels, a burst of frequency domain symbols is converted to the time domain by an Inverse Fast Fourier Transform (IFFT) procedure. The individual frequency domain symbols are also referred to as "tones." To ensure that orthogonality is maintained in channels where signals may take multiple paths from the transmitter to the receiver, a cyclic prefix is added to the resulting time domain burst. A cyclic prefix is a duplicate of the last portion of the time domain burst that is appended to the burst's beginning. To ensure orthogonality, the cyclic prefix should be as long as the duration of the impulse response of the channel.

In one embodiment of the present invention, an OFDM transceiver monitors reception quality and subchannels of received OFDM bursts. Where reception quality falls below a threshold, the transceiver may signal a node that transmits these bursts to leave a subchannel or group of subchannels unused when transmitting payload data. For example, in a 256 subchannel burst, groups of 16 subchannels may be turned on or off for use in transmitting payload data based on reception quality. In this way, interference is mitigated since subchannels experiencing detrimental interference will be left out of data transmission. The map of impaired subchannels varies in response to real time measurements, thus allowing transmission quality to be maintained in the face of a dynamic interference environment.

Figure 2:
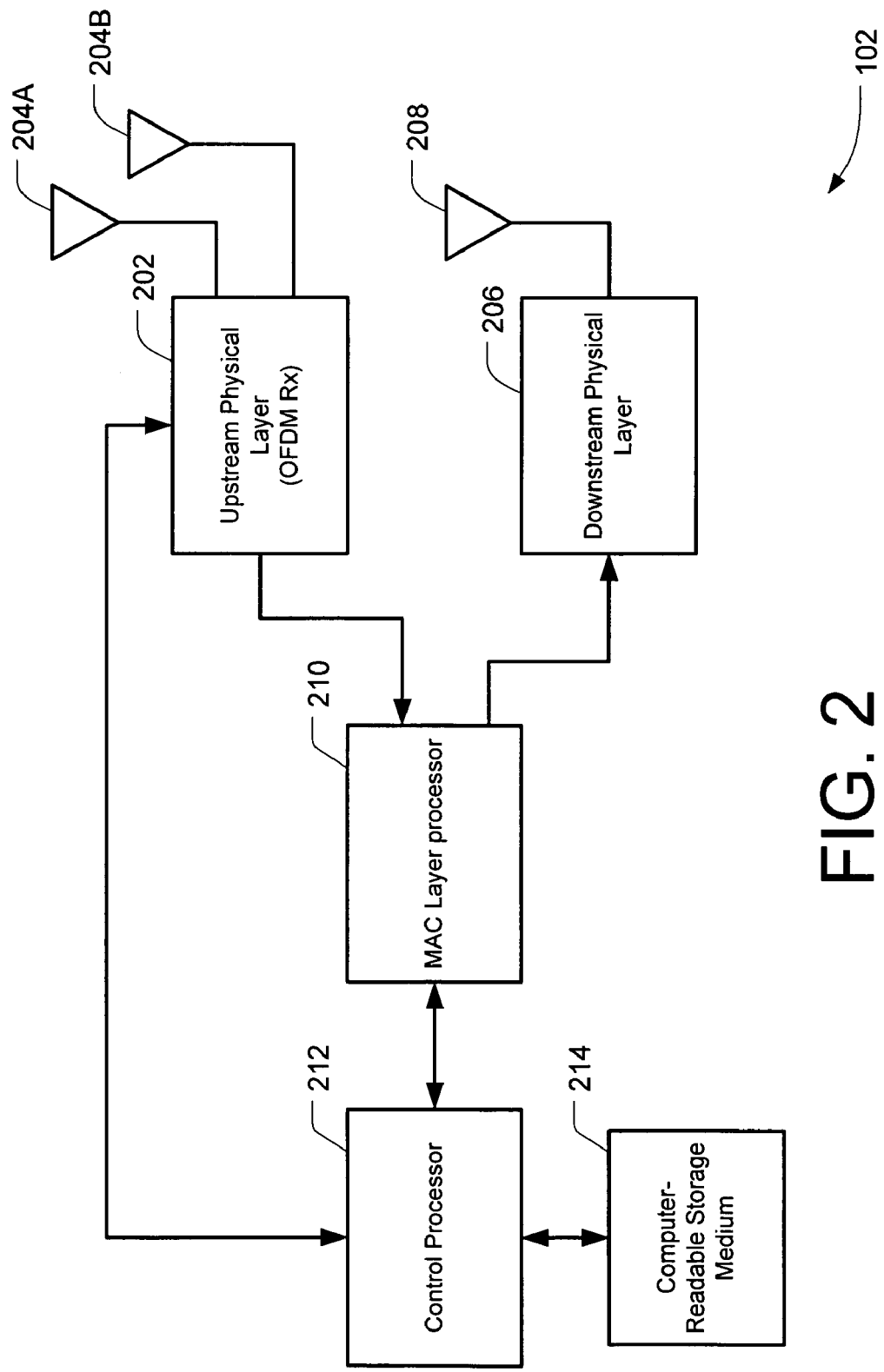
FIG. 2 depicts elements of a central access point according to one embodiment of the present invention.

FIG. 2 depicts the top-level structure of central access point 102 according to one embodiment of the present invention. An upstream physical layer block 202 is coupled to receiver antennas 204A and 204B to receive and process signals received from subscriber units 104. Alternatively, one antenna or more than 2 antennas may be utilized. Further details of upstream physical layer block 202 will be described with reference to FIG. 3. In the embodiment discussed here, upstream physical layer block 202 is implemented as an OFDM receiver. Transmissions from central access point 102 to subscriber units 104 are processed by a downstream physical layer block 206 that is coupled to a transmitter antenna 208. Alternatively, a single antenna substitutes for antenna 208 and one of antennas 204A and 204B and is shared by use of a diplexer. In one embodiment, OFDM is also used for the downstream transmission, but the present discussion will not focus on particular modulation techniques for downstream transmission.

A MAC layer processor 210 performs the MAC layer processing operations specified by DOCSIS v1.1. MAC layer processor 210 also exchanges data with hardware implementing higher layer network protocols (not shown) that represent the sources and destinations of payload data carried across network 100.

A control processor 212 performs interference management functions according to the present invention. In coordination with upstream physical layer block 202, it tracks reception quality within OFDM subchannels for individual subscriber units. Control processor 212 also generates instructions to individual subscriber units informing them as to which subchannels should be left unused for upstream payload data transmission due to impairment by interference. These instructions are sent to MAC layer processor 210 for inclusion in the downstream message traffic. Control processor 212 may be implemented in any suitable manner. For example, control processor 212 may be a dedicated processor, custom logic, software operating on a processor performing other functions, etc. Control processor 212 may execute software instructions in any suitable machine language or high level programming language. Instructions for execution by control processor 212 may be stored on a computer-readable storage medium 214. Storage medium 214 may represent a memory device such as a random access memory device, a magnetic storage medium, an optical storage medium, etc. Instructions on storage medium 214 may be loaded from another storage medium such as, e.g., a compact disk (CD), a digital video disk (DVD), a floppy disk, etc. Another example of loading instructions from a storage medium is downloading software from a network.

Figure 3:
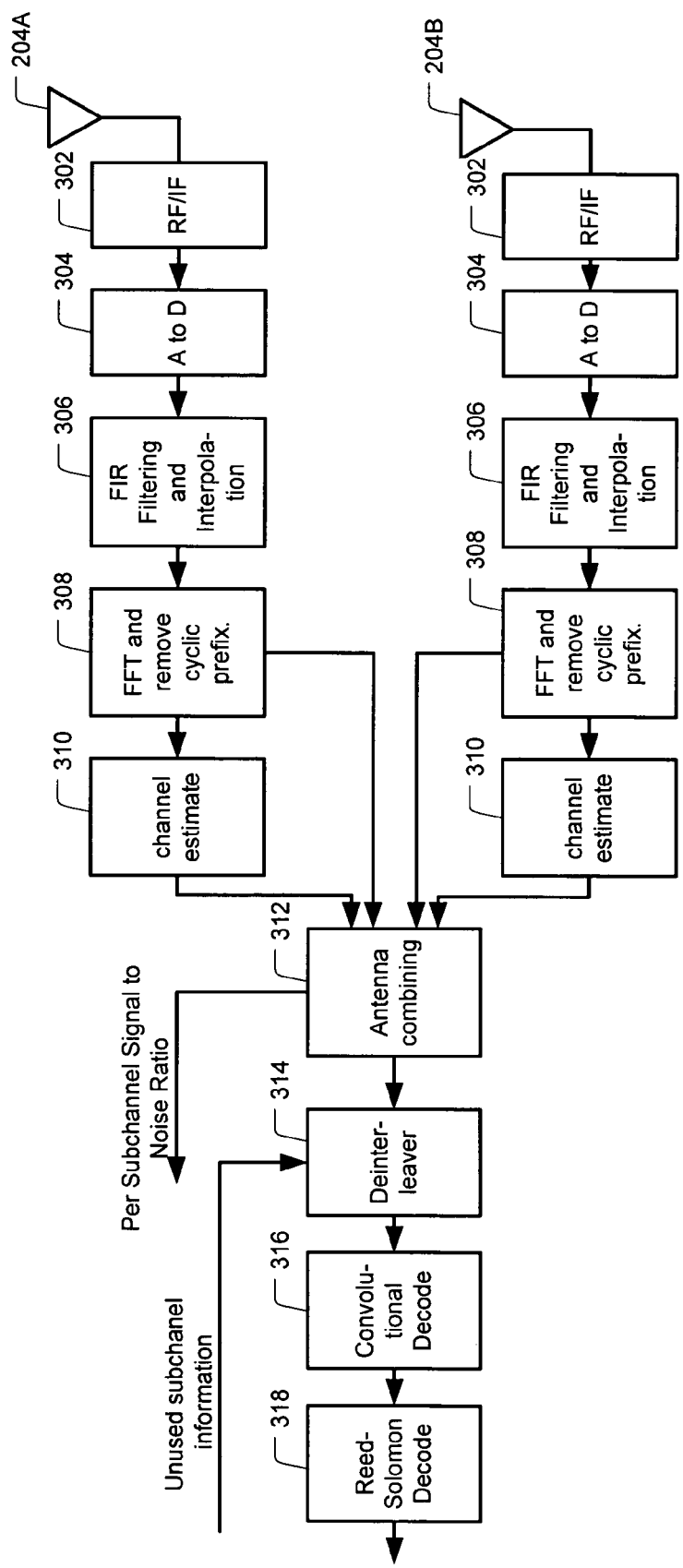
FIG. 3 depicts details of an OFDM receiver within the central access point of FIG. 2.

FIG. 3 depicts further details of upstream physical layer block 202. FIG. 3 is depicted with reference to a two antenna embodiment so that many receiver components are duplicated for each antenna. The OFDM receiver architecture described here optimally combines the signals from multiple antennas in order to maximize the signal to interference plus noise ratio (SINR) on a subchannel-by-subchannel basis. Further details of one embodiment of this technique may be found in U.S. patent application Ser. No. 09/565,669 filed on May 4, 2000.

The initial receiver blocks are duplicated for each antenna but will be described here only once. An RF/IF system 302 performs initial analog filtering and amplification prior to downconversion to an intermediate frequency (IF) where further filtering and signal conditioning may be performed. The signal is then converted to baseband for input to an analog to digital converter (A to D) 304. Alternatively, analog to digital conversion may occur at the IF. Further filtering and interpolation occurs in an FIR filter block 306. The next stage is an FFT processor 308 that removes the cyclic prefix from each time domain burst and then converts the time domain burst to the frequency domain burst. Some of the frequency domain symbols will typically be training symbols having known transmitted values. Others will carry payload data while yet others are left blank or "don't care" due to interference conditions.

A channel estimation processor 310 uses the received values of the training symbols to determine the channel response over the entire available frequency domain channel. Details of channel estimation techniques are described in U.S. Pat. No. 6,144,711 issued on Nov. 7, 2000, the contents of which are herein incorporated by reference.

An antenna combining block 312 receives as inputs the channel estimates provided by channel estimation processors 310 and the received frequency domain symbol values for each subchannel output by FFT blocks 308. Antenna combining block 312 outputs a single soft decision for each subchannel (except for the training subchannels) for each burst. In one embodiment, the soft decision includes an estimate of the transmitted symbol and a confidence value of use to the later decoding stages.

In one embodiment, the information received via the multiple antennas is combined as follows. Channel estimation processor 310 estimates the channel response at each training symbol position. Antenna combining block 312 estimates the noise and/or interference on each training symbol as received by each antenna based on the known transmitted values of the training symbols. This noise and/or interference is statistically characterized over time. The data (non-training) symbols received from each antenna are then combined in an optimal fashion using the statistical characterization of noise and/or interference obtained for the nearest training symbol. The result of this step is a hard decision estimate for each frequency domain subchannel except for the ones used for training. Then the noise and/or interference present on each of the data subchannels is computed by finding, for each antenna, the difference between the data symbols as received and the hard decision values that have been determined using the statistical characterization of noise and/or interference of the training symbols. This statistical characterization of interference and/or noise on the data symbols is then preferably smoothed over frequency.

Soft decision estimates are then generated for each subchannel by optimally combining the received data symbol values in accordance with this per subchanel characterization of noise and/or interference. To facilitate decoding, soft decision values are generated for individual bits by use of the technique described in U.S. patent application Ser. No. 09/565,669 filed on May 4, 2000.

It will be appreciated that the above processes of combining the signals for multiple antennas produces a statistical characterization of noise and/or interference for each data symbol position or subchannel. This is in the form of a signal to noise plus interference ratio (SINR) estimate. According to the present invention, these estimates may be used for selecting subchannels to be removed from service. It should be noted that the SINR estimate may be obtained in any suitable way or another measure relevant to the impact of interference on subchannels or groups of subchannels may be developed. Also, the SINR and intermediate statistical characterizations over time are preferably computed independently for each subscriber unit although successive bursts processed by antenna combining block 312 will typically originate with disparate subscriber units.

A deinterleaver 314 reorders the soft decision values output by antenna combining block 312 to invert the operation of an interleaver at the transmit end. Deinterleaver 314 outputs individual bits and soft decision values for each bit. Deinterleaver 314 is aware of which bits originate with subchannels that are not currently used for upstream transmission due to interference conditions and discards these bits.

A convolutional decoding block 316, e.g., a Viterbi decoder, convolutionally decodes the received data based on the deinterleaved soft decision values. To ensure that soft decision values for bits of one OFDM burst do not affect decode results for other OFDM bursts, each series of soft decision values for a single OFDM burst is augmented with a series of hard decision values that are input to clear the internal state of decoding block 316 prior to decoding the next OFDM burst.

The output bits of convolutional decoding block 316 are fed to a Reed-Solomon decoding block 318. It should be noted that in the embodiment described herein, there is a one-to-one correspondence between OFDM bursts, Reed-Solomon codewords, and MAC layer packets that each consume a single upstream transmission minislot. The Reed-Solomon codeword size fluctuates with variations in the number of payload data bits in the burst, although the number of Reed-Solomon parity symbols within the codeword itself may not. Further details of handling decoding over successive OFDM bursts from multiple sources and matching convolutional code rate and Reed-Solomon codeword structure to burst capacity are discussed in U.S. patent application Ser. No. 09/419,444 filed on Oct. 15, 1999, now U.S. Pat. No. 6,654,921.

Figure 4:
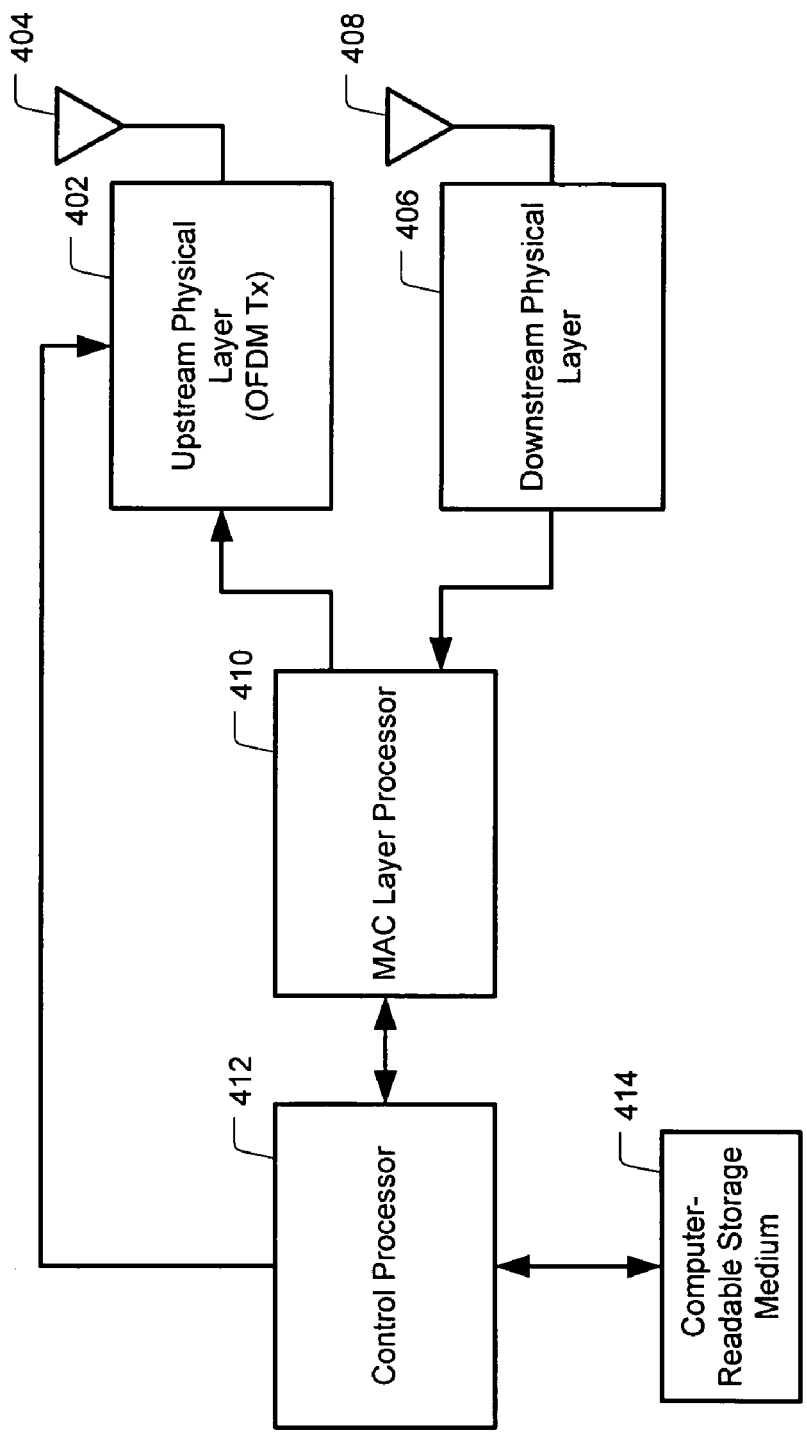
FIG. 4 depicts elements of a subscriber unit according to one embodiment of the present invention.

FIG. 4 depicts elements of a representative subscriber unit 104 according to one embodiment of the present invention. An upstream physical layer block 402 transmits OFDM signals upstream via an antenna 404. Further details of upstream physical layer block 402 will be described in reference to FIG. 5. A downstream physical layer block 406 receives transmissions from central access point 102 via an antenna 408 or alternatively, via multiple antennas. Also, the two physical layer blocks 402 and 406 may share a common antenna by use of a diplexer. A MAC layer processor 410 performs functions specified by DOCSIS v1.1 including receiving control messages from central access point 102 and timing upstream transmissions in response to these control messages. MAC layer processor 410 also serves as an interface to higher layer protocols (not shown) that source and sink data carried via network 100.

A control processor 412 receives interference-handling instructions from central access point 102 via MAC layer processor 410. In response to these interference-handling instructions, control processor 412 controls subscriber unit 104 to remove certain subchannels from use for upstream data transmission. Control processor 412 may be implemented in any of the ways discussed in reference to control processor 212 in central access point 102. Also, instructions for controlling processor 412 may be similarly stored on a computer-readable medium 414 or loaded from other such storage media.

Figure 5:
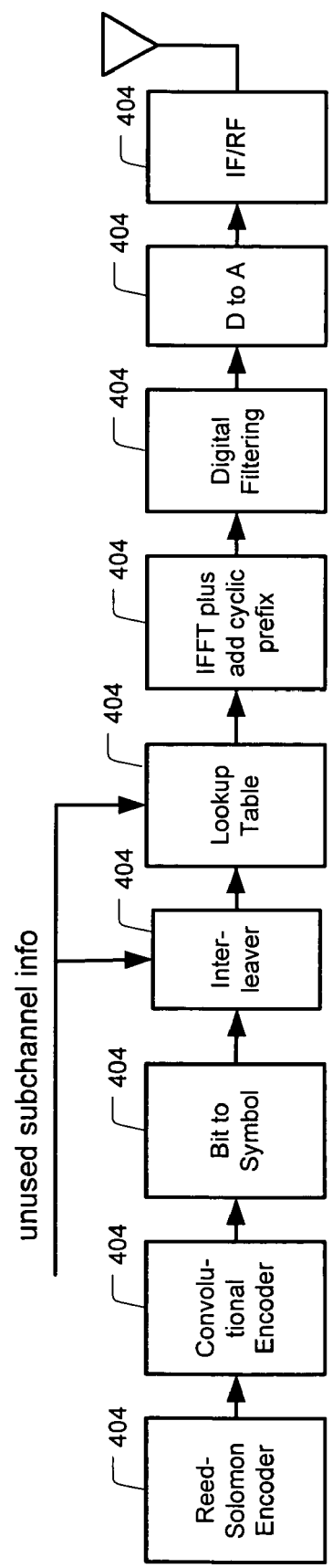
FIG. 5 depicts details of an OFDM transmitter within the subscriber unit of FIG. 4.

FIG. 5 depicts further detail of upstream physical layer block 402 within subscriber unit 104. Data to be forwarded upstream is input to a Reed-Solomon encoder block 502. One MAC layer frame that will occupy one upstream transmission minislot represents the input data for a single codeword and a single OFDM burst. MAC layer processor 410 adjusts the upstream MAC layer frame size to adjust for changes in the number of utilized subchannels. The payload data input to the Reed-Solomon encoder, and consequently the codeword size, will vary accordingly.

A convolutional encoder 504 follows the Reed-Solomon encoder 502. The input to convolutional encoder 504 is flushed with zeroes after every burst to ensure the removal of interburst dependencies from the decoded data that would render receiver decoding of data from multiple time multiplexed sources impossible. Further details of this procedure are disclosed in U.S. patent application Ser. No. 09/419,444 filed on Oct. 15, 1999, now U.S. Pat. No. 6,654,921. The output of convolutional encoder 504 is fed to a bit to symbol conversion block 506 that maps sets of data bits to the symbol constellation used for transmission. An interleaver 508 reorders the constituent bits of each symbol output by block 506 to distribute adjacent bits across a group of symbols within the burst. Interleaver 508 uses information about unused subchannels when deciding how to distribute bits across these groups of symbols. It has to do this because it is imperative that useful data is not allocated to interleaver output symbols that correspond to subchannels which are not available for data communication.

A lookup table 510 has an entry for each subchannel indicating whether that subchannel is currently available or not for data communication or has been deemed unusable due to impairments. Interleaver output is not utilized for subchannels that are currently excluded from use for payload data transmission. Training symbols are inserted at appropriate positions.

An IFFT block 512 converts bursts of time domain symbols to the frequency domain and adds the cyclic prefix. A digital filtering block 514 performs baseband filtering operations prior to input to a digital to analog converter block 516. An IF/RF system block 518 converts the analog signal to an intermediate frequency (IF), filters and amplifies this IF signal, converts the IF signal to the radio frequency (RF) that will be used for over air transmission, and then amplifies the RF signal for transmission via antenna 404.

Figure 6:
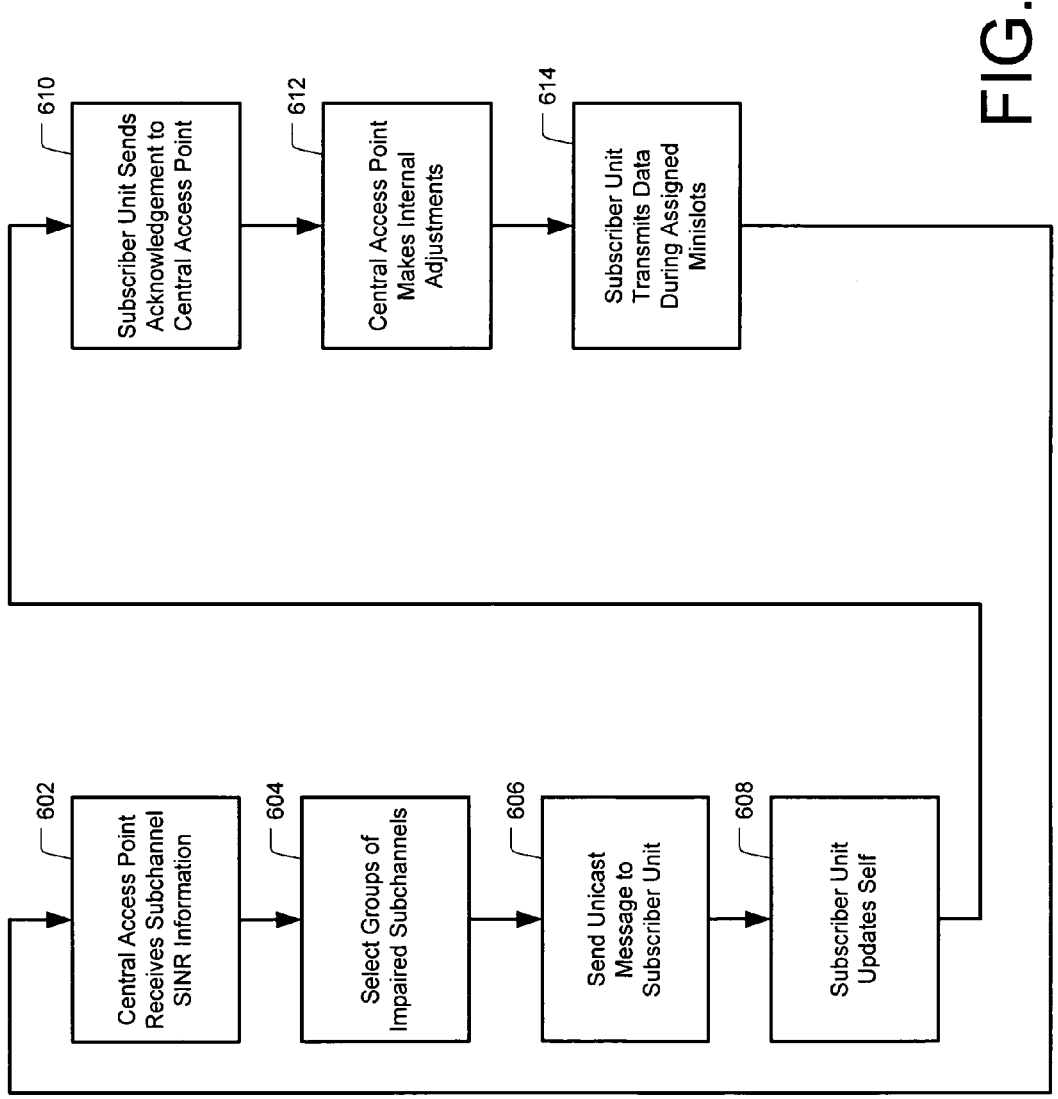
FIG. 6 is a flowchart describing steps of operating an OFDM communication link to alleviate the impact of interference according to one embodiment of the present invention.

FIG. 6 is a flow chart describing steps of selecting impaired subchannels for a particular subscriber unit and making adjustments at both the subscriber unit and the central access point according to one embodiment of the present invention. At step 602, control processor 212 in central access point 102 receives SINR measurements for each of the non-training subchannels from upstream physical layer block 202.

In one embodiment, for the purpose of selecting the subchannels to be removed from service, the channel is divided into contiguous groups of subchannels. For example, if there are 256 subchannels in the burst, they may be divided into 16 blocks of 16 subchannels. Rather than deleting individual subchannels from service, an entire block would be deleted. This saves on the data required to communicate the map of impaired subchannels. It has been found that the interference level tends to be well correlated among subchannels of a contiguous group so that there is little or no loss of performance from selecting impaired subchannels in this manner. In an alternative embodiment, subchannels are individually selected as being impaired.

At step 604, control processor 212 selects groups of impaired subchannels. This is done by determining the average SINR of each group over time and comparing it to a threshold. The threshold may be, e.g., 10 dB over the SINR corresponding to the minimum receivable signal. Channel groups whose average SINR over time are found to be below that threshold are removed from operation. Subchannels reserved for transmitting training symbols are, in one embodiment, left in use even if the groups that they fall within are deemed to be impaired. This is so the central access point can continue to estimate the response across the entire channel.

The SINR average is preferably updated for each packet or OFDM burst received from the subscriber unit. In the course of network operation, these will generally arrive at irregular intervals depending on the level of upstream traffic from that subscriber unit. The SINR average is kept as a weighted average. When a new SINR sample arrives, its impact on the weighted average depends on how long ago the previous sample was received. If the previous sample is old, the new sample is given a relatively high weight. If the previous sample is recent, the new sample is given a relatively low weight. The list of impaired subchannels may be updated, e.g., every 100 upstream packets.

There are several adjustments to network operation that occur in response to a change in the map of impaired subchannel groups. Within central access point 102, deinterleaver 314 should be updated to reflect the current groups of subchannels that are being used by the currently transmitting subscriber unit. The MAC layer processors at both ends will be aware of the new upstream packet size that matches the burst data size and will adjust operations appropriately. The codeword size will also change accordingly and so the Reed-Solomon encoder 502 and Reed-Solomon decode block 318 will need to take account of this. Decode block 318 needs to be able to cater for this variation on a minislot by minislot basis in accordance with the subscriber unit whose transmission is expected. Within subscriber unit 104, interleaver 508 will modify the way it distributes bits across groups of symbols so that useful data is not allocated to interleaver output symbols that correspond to subchannels which are no longer available for data communication. Similarly, lookup table 510 will adjust its map of deleted subchannels so that they are not loaded with payload data.

The adjustments needed at the subscriber unit are performed upon the receipt of instructions from the central access point. The central access point does not make its own adjustments until an acknowledgement is received from the subscriber unit confirming that future upstream transmissions will observe the new map of deleted subchannels. Accordingly, at step 606, central access point 102 sends a unicast message to the subscriber unit with the new map of deleted subchannels being included in the unicast message. At step 608, the subscriber unit, having received the unicast message, updates itself so that future transmissions will be in accordance with the new map. At step 610, the subscriber unit sends an acknowledgement of the unicast message upstream to the central access point. Then at step 612, the central access point updates its internal state to handle reception using the new subchannel map from that subscriber unit. At step 614, the subscriber unit transmits data upstream during assigned minislots in accordance with DOCSIS v1.1. As the data is received at the central access point, subchannel SINR information is again updated at step 602.

In the embodiment described herein in detail, decisions as to impaired subchannels are made separately for each individual subscriber unit at central access point 102 based on SINR measurements made on upstream transmissions from that subscriber unit. In an alternative embodiment, the SINR measurements per subchannel are tracked for the entire network or for a particular geographically grouping of subscriber units and decisions concerning subchannels to be deleted from service are made for the entire network or for geographic groupings of subscriber units. It will be appreciated that the present invention may also be applied to, e.g., downstream transmissions or another type of network or link.

The above-described interference handling system minimizes the impact of detrimental interference. Loss of data-carrying capacity is limited to subchannel groups that are actually impacted by interference rather than across the entire channel. This also results in more efficient utilization of the selected FEC scheme, because it allows the available error correcting capabilities to be targeted at subchannels which have a better chance of conveying error-free payload. Since the map of impaired subchannels is updated frequently over time, communication is not affected by rapid changes in the interference environment.

It is understood that the examples and embodiments described herein are for illustrative purposes only and that various modifications or changes in light thereof will be suggested to persons skilled in the art and are to be included within the spirit and purview of this application and scope of the appended claims and their full scope of equivalents. All publications, patents, and patent applications cited herein are hereby incorporated by reference in their entirety.

What is claimed is:

1. In a point to multipoint OFDM communication network, a method for operating a central access point, said method comprising:
   monitoring reception quality in a plurality of OFDM subchannels;
   designating a selected subchannel as below a quality threshold; and
   instructing a subscriber unit to not transmit payload data in said selected subchannel,
   wherein monitoring comprises:
   receiving a series of OFDM bursts from said subscriber unit; and
   measuring signal to noise ratio in said plurality of subchannels for each of said series of OFDM bursts, and
   wherein receiving comprises:
   receiving said series of OFDM bursts via a plurality of antennas;
   statistically characterizing noise and/or interference superimposed on data symbols of said OFDM bursts based on predefined training symbols within said OFDM bursts; and
   determining reception quality based on ratio of noise and/or interference to signal for said data symbols.

2. In a point to multipoint OFDM communication network, a method for operating a subscriber unit, said method comprising:
   receiving an instruction message from a central access point, said instruction message including information identifying OFDM subchannels to be left unused in future upstream transmissions;
   encoding data to be transmitted into an encoded packet in a manner that takes into account that there are OFDM subchannels left unused in accordance with said instruction message, and such that the encoded packet has a length that takes into account that there are OFDM subchannels left unused in transmission in accordance with said instruction message; and
   transmitting said encoded data packet as one or more OFDM burst wherein OFDM subchannels are left unused in accordance with said instruction message.

3. In a point to multipoint OFDM communication network, apparatus for operating a central access point, said apparatus comprising:
   an OFDM receiver that monitors reception quality in a plurality of OFDM subchannels; and
   a control processor that designates a selected subchannel as below a quality threshold and instructs a subscriber unit to not transmit payload data in said selected subchannel,
   wherein said OFDM receiver comprises:
   a plurality of converters that convert time domain OFDM bursts received from said subscriber unit via a plurality of antennas into frequency domain OFDM bursts; and
   an antenna combining block that statistically characterizes noise and/or interference superimposed on data symbols of said frequency domain OFDM bursts based on predefined training symbols within said frequency domain OFDM bursts; and
   wherein reception quality is determined based on ratio of noise and/or interference to signal for said data symbols.

4. In a point to multipoint OFDM communication network, apparatus for operating a subscriber unit, said apparatus comprising:
   a control processor configured to receive an instruction message from a central access point, said instruction message including information identifying OFDM subchannels to be left unused in future upstream transmissions;
   an error correction encoder configured to encode data to be transmitted into an encoded packet in a manner that takes into account that there are OFDM subchannels left unused in accordance with said instruction message, and such that the encoded packet has a length that takes into account that there are OFDM subchannels are left unused in transmission in accordance with said instruction message; and
   an OFDM transmitter configured to transmit said encoded packet as one or more OFDM bursts wherein OFDM subchannels are left unused in accordance with said instruction message.

\* \* \* \* \*

UNITED STATES PATENT AND TRADEMARK OFFICE
CERTIFICATE OF CORRECTION

PATENT NO. : 6,990,059 B1 Page 1 of 1
DATED : January 24, 2006
INVENTOR(S) : Anikhindi et al.

It is certified that error appears in the above-identified patent and that said Letters Patent is hereby corrected as shown below:

Column 1,
After line 17, add:
-- U.S. Patent Application No. 09/565,669 entitled, "OFDM INTERFERENCE CANCELLATION BASED ON TRAINING SYMBOL INTERFERENCE" filed May 4, 2000, now U.S. Patent No. 6,973,134. --.

After line 20, add:
-- The contents of the above-identified applications are incorporated herein by reference in their entirety for all purposes. --.

Column 10,
Lines 55 and 63, change "subschannels" to -- subchannels --.
Lines 58-59, change "subchannels are left unused" to -- subchannels left unused --.

Signed and Sealed this

Second Day of May, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,990,059 B1 | Page 1 of 1 |
| APPLICATION NO. | : 09/947283 | |
| DATED | : January 24, 2006 | |
| INVENTOR(S) | : Anikhindi et al. | |

It is certified that error appears in the above-identified patent and that said Letters Patent is hereby corrected as shown below:

In Column 1 under the heading "Statement of Related Applications" after line 20, please add the following paragraph:
--The contents of the above-identified applications are incorporated herein by reference in their entirety for all purposes.--

In column 10, line 55, kindly change "subchannels" to --subchannels--.

In column 10, lines 58-59, kindly change "subchannels are left unused" to --subchannels left unused--

In column 10, line 63, kindly change "subchannels" to --subchannels--.

Signed and Sealed this

Twenty-second Day of August, 2006

JON W. DUDAS
*Director of the United States Patent and Trademark Office*